Patented June 4, 1946

2,401,335

UNITED STATES PATENT OFFICE 2,401,335

RECOVERY OF DIKETONES AND RELATED PRODUCTS FROM TECHNICAL LIQUORS CONTAINING DIKETONES

Douglas Seymour Calder and Kenneth Bryson Fleer, Memphis, Tenn., assignors to Forest Products Chemical Company, Memphis, Tenn., a corporation of Tennessee No Drawing. Application July 12, 1943, Serial No. 494,396

17 Claims. (Cl. 260—593)

This invention relates to Recovery of diketones and related products from technical liquors containing diketones; and it includes a process of recovering diketones and related products, from technical liquors containing low molecular diketones having keto groups attached to adjacent carbon atoms, by reacting the diketone in such a liquor with a primary monohydric alcohol in excess in the presence of an acetalizing catalyst to form an oily product of the nature of an acetal, this oily product being recovered by neutralizing and distilling the resulting reaction mixture. The invention also includes a method of recovering diketones and derivatives thereof from said oily product wherein said product is hydrolyzed by heating it in the presence of a hydrolyzing catalyst to form said diketones, said hydrolysis being usually conducted during distillation of said oily product whereby a yellow distillate containing said diketones and said alcohol is recovered, the diketones being advantageously recovered from said yellow distillate by converting either the alcohol or the diketones into a decomposable product having a boiling point outside the range of about 70° to 110° C., distilling to separate said compound from the diketones or the alcohol, respectively, and then recovering the diketones; all as more fully hereinafter set forth and as claimed.

This application is a continuation-in-part of our copending application, Serial Number 416,133, filed October 22, 1941. In this prior application we described a process of recovering diacetyl from various "pyroligneous oils" obtained in the usual technical treatment of pyroligneous liquors, said process consisting in hydrolyzing the pyroligneous oil, usually by distilling it in the presence of an acid catalyst to obtain a yellow distillate and recovering diacetyl values from said distillate either in the form of dimethyl glyoxime or as diacetyl itself. In the present application we disclose and claim methods of producing certain oily products which, for convenience, may still be called "pyroligneous oils" in high yield from various technical liquors containing diketones, including the technical liquors obtained in the wood distillation industry. We also describe and claim original methods of recovering diacetyl and other valuable products from these pyroligneous oils.

In our acknowledged copending application we mentioned the various pyroligneous oils, which are recovered in the Suida, the extraction and the azeotropic processes of treating pyroligneous acid, as being the richest sources of diacetyl which we had discovered. We were in error in assuming that these oils were to be found in the pyroligneous acid. The fact is that the "pyroligneous oils" with which this application deals are not constituents of the crude pyroligneous acid as produced by the carbonization of wood and like material. In fact, if our pyroligneous oils were to be added to crude pyroligneous acid they would be fully hydrolyzed and destroyed for all practical purposes. Crude pyroligneous acid contains only about 3 per cent methanol, from 85 to 90 per cent water and 5 to 12 per cent acid. Such a medium would be ideal to produce hydrolysis of our pyroligneous oils, as will be shown below. But in our prior application we mentioned the surprising fact that diacetyl can be recovered in high yield by hydrolysis of the so-called weak alcohol oil, obtained in the Suida process, in spite of the fact that this oil is obtained in a tails fraction during the distillation which follows refluxing of crude methanol over caustic, during which caustic treatment any diacetyl present as such must be destroyed by resinification. We explained this fact on the basis that the caustic and distillation treatments must cause the concentration of some type of compounds present which are then capable of being converted into diacetyl by hydrolysis.

We have since found that this explanation is at least partly correct and we have discovered how the destruction by the caustic treatment of the diacetyl present as such in the crude methanol can be prevented by initially converting it into these same oily compounds which are here called pyroligneous oils. Knowledge of the exact nature of these compounds is immaterial for the purposes of the present invention but we have discovered that these compounds are of the nature of acetals. They can be formed by treating any diketone-containing liquor with an excess of methanol or other primary, monobasic alcohol in the presence of an acetal-forming catalyst. And, in the case of some industrial liquors, such as crude methanol and certain fermentation liquors, the alcohols and diketones are already in favorable ratios for the formation of these pyroligneous oils; hence it is only necessary to add a catalyst to promote their formation. Once formed these compounds can be stabilized by making the liquor alkaline. They are stable towards alkali but unstable in an acid medium. They are apparently formed by a condensation reaction of the diketones with the alcohol, since they can be hydrolyzed readily to give diketones and the alcohol by heating them with an acid catalyst. Since they are stable in the presence of alkalis, it is convenient to separate them from the excess alcohol by making the condensation reaction products alkaline and then distilling. The pyroligneous oils separate from a tails fraction as a supernatant oily layer and can thus be recovered.

It will be noted that the above procedure differs from that employed in refining crude methanol by the fact that any diacetyl present as such in the crude methanol is first converted into the pyroligneous oils before the caustic treatment. It should also be noted that it is impossible to separate diacetyl from crude methanol, for example, by direct fractionation. Even with the best of fractionating equipment any separation obtained is very poor.

One of the main objects of refining methanol or alcohols is the removal of colored impurities such as the diketones. In the usual processes the diketones are destroyed. By the use of the present invention the diketones are removed from the alcohol and are largely recovered as valuable products, and this can be accomplished with no alteration or complication of equipment, and only a minor change in the operation of the equipment. The net result is the recovery of new products owing to a slight change in the refining procedure.

We have found that a small proportion of the diacetyl present in crude methanol may be converted into pyroligneous oils provided that the crude methanol is stored for some time before the refining operation. If crude methanol is refined, using a caustic alkali, without a preliminary storage period, substantially no weak alcohol oil is found in the tails fraction recovered during distillation, all the diacetyl being destroyed during refining. But if the crude methanol is retained in storage for several days prior to the refining treatment it is possible in some cases to recover up to about 10 to 15 per cent of the diacetyl present originally in the crude methanol, by hydrolysis of the recovered weak alcohol oil, using the method described in our acknowledged co-pending application. But by using the method described in our present application it is possible to recover at least about 75 per cent of the diacetyl available in the crude methanol.

Surprisingly we have found that diacetyl will not condense with secondary or tertiary alcohols to form the oily compounds described. Nor will polyhydric alcohols form products of the same general type. We have found further that, in order to form these bodies in any substantial yield it is necessary to have the alcohol present in excess of molecular proportions and in concentrations of at least 30 per cent and preferably above 50 per cent by volume. To show the effect of water on the reaction, it may be mentioned that, with a substantially anhydrous alcohol, containing approximately 97 parts alcohol and 3 parts diacetyl, it is possible to convert approximately 80 per cent of the diacetyl content to the desired oily compounds. If 100 parts of water are added to this alcohol-diacetyl mixture only about 6 per cent of the diacetyl can be converted, while if 200 parts of water should be added, the yield of oily product practically disappears.

Diacetyl and other homologous diketones can be recovered from any technical liquor containing the same by use of the methods described. In the fermentation industry, for example, some liquors are obtained which contain small amounts of diacetyl, as well as alcohols, acetone, aliphatic acids and other compounds. This is the case, for example, in the fermentation of carbohydrate material by various bacteria, such as *Clostridium acetobutylicum*. During the distillation of these fermentation liquors for the recovery of the alcohols etc. it is possible to concentrate the diacetyl in one or more fractions which may or may not also contain alcohol. If the alcohol is present in sufficient excess and if it has a concentration of at least about 50 per cent by weight, it is only necessary to add an acetalizing catalyst and to permit the mixture to stand at room temperature for a period of about 24 hours or longer to form the desired oily compounds, or the mixture can be heated, in which case this formation will be accelerated. If too much water is present this should be removed since water tends to hydrolize the oily compounds and hence reverse the reaction. Acetone does not interfere and can be distilled off as a heads fraction after the reaction. After the formation of the oily compounds, the mixture can be made alkaline and distilled, the oily compounds being thereafter separated from the distillate. These compounds usually come over in a tails fraction and if sufficient water is present, they separate as a supernatant layer.

In the case of treating pyroligneous liquors, by the Suida process, for example, it is only necessary to treat the crude methanol, which normally contains from about 1.5 to 4 per cent of diketones, with an acetalizing catalyst in order to convert these diketones into pyroligneous oils, and then proceed as usual with the caustic refining and distillation. The quantity of weak alcohol oil then recovered in the tails fraction of the distillate is several times that which can be obtained in the absence of the conversion step.

The catalysts which are effective in condensing alcohols with diacetyl and other diketones to form pyroligneous oils are of the same type as those which are effective in hydrolyzing the oils to form the diketones, which indicates that an equilibrium reaction is involved in the condensing and hydrolyzing actions. We have found that any of the catalysts which have been reported as effective in catalyzing the formation of acetals are likewise effective in catalyzing our condensation reaction. Among these are ammonium chloride, calcium chloride, zinc chloride, ferric chloride, boron trichloride, boron trifluoride, mineral acids, such as hydrochloric, phosphoric and sulfuric acids, orthoformic esters, Twitchell's reagent, aromatic sulfonic acids etc. Hydrolyzing catalysts, as well as acid catalysts in general are effective. These catalysts can be employed in small amounts ranging from about 0.05 to 5 per cent by weight. Some hydrolysis can be produced merely by boiling the pyroligneous oils in the presence of water. When mineral acids are employed as catalysts, it is desirable to use less than 5 per cent of catalyst in order to avoid tar formation.

When natural pyroligneous oils are hydrolyzed as described to produce diketones, it is found that about 80 per cent of the diketone product consists of diacetyl, 14 per cent consists of acetyl propionyl (2,3-diketopentane), 1 to 2 per cent consists of 2,3-diketohexane and the remainder includes traces of still higher homologues.

The pyroligneous oils which are obtained by our present process, which appear to contain the same components as the natural pyroligneous oils, have been found useful for several purposes. They can be used as high boiling solvents in lacquer compositions and are valuable additions since they have some blending qualities. They are capable of dissolving a considerable percentage of water and/or hydrocarbon solvents, for example. They can be used as extenders of wood-preserving creosote oils. And they can be used as organic solvents in many organic reactions. The oil formed from methanol and diacetyl has a boiling point (uncorrected) of about 145–146° C. It does not freeze down to −82° C. and has a specific gravity of the order of 0.987 at 20°/15°. It forms an azeotrope with water having a boiling point of the order of 93–94° C. But one of the most important uses of the pyroligneous oils is that of a raw material for the production of diacetyl and other diketones. The method of hydrolyzing these oils for the production of these compounds is fully described below and was disclosed in our acknowledged copending application.

By the steps of converting the diacetyl to a pyroligneous oil, recovering the latter, hydrolyzing it and then distilling, the diketones can be concentrated easily from 1 to 2 parts in 100 parts of methanol to 1 part in 1–1½ parts of methanol. This effects large economies in separating the diacetyl from the methanol, since, as an examination of the examples below will show, the work of separating the methanol is proportional to the amount of it present.

The following specific examples illustrate the processes of the present invention and constitute practical operating embodiments thereof.

*Example 1.—Production of a pyroligneous oil from diacetyl and methanol*

In this example we dissolved 100 parts of pure diacetyl (B. P. 88–91° C.) in 500 parts pure methanol. No heat effects were observed. We then added 2 parts of ammonium chloride and agitated the mixture. Thereupon a very definite warming was observed. After refluxing for half an hour, the mixture was allowed to stand over night, then made slightly alkaline with a dilute aqueous sodium carbonate solution, and fractionated. After several hundred parts of methanol were distilled away at about 65° C., the temperature then rose rather sharply to 80° and finally to 94° C., the boiling point of the oil-water binary, when the distillate, which was water-white in color, was found to break into two phases. The supernatant oily layer is the desired oily compound which we have called a pyroligneous oil and a total of about 80 parts was recovered. If this oil is separated from the water layer and fractionated, as soon as a small quantity of aqueous heads is removed, a large fraction is obtained, constituting better than 80 per cent of the charge, boiling very flatly at 145–146° C. and water-white in color. This might be called a synthetic pyroligneous oil.

If ethyl alcohol is substituted for the methanol employed in this example, an oil of somewhat similar properties is obtained having a boiling range of about 163–165° C. The corresponding oil obtained with n-butyl alcohol has a boiling range of 228–230 C., while n-propyl alcohol gives an oil having a boiling point range of about 196–197° C. Higher molecular alcohols and higher diketones give still higher boiling compounds. For example, the compound obtained from acetyl propionyl and methanol has a boiling point of about 162½° C.

*Example 2.—Hydrolysis of a pyroligneous oil*

In this example we hydrolyzed the oil obtained in Example 1. 100 parts of this oil were placed in a still together with several hundred parts of water. One part of concentrated sulfuric acid was added. The still was provided with a good column and still-head. Heating of the still was commenced and it was found that hydrolysis was complete before the boiling point was reached. Distillation was continued, using a reflux ratio of 5 to 1, until the temperature reached 100° C. There was no evidence of diacetyl or methanol in the residue remaining in the still after this distillation. A yellow colored distillate was obtained containing diacetyl, methanol and water. A portion of this was analyzed by the Barnicoat method to determine the total diacetyl present. The quantity found was 56 parts. The rest of the distillate was distilled several times with dilute aqueous caustic soda to remove the diacetyl, care being taken to lose none of the methanol. Finally a clean methanol-water mixture was obtained which, by a gravity determination, gave the amount of methanol recovered from the oil. This amounted to 43 parts. It is thus seen that our pyroligneous oils can be hydrolyzed readily with substantial recovery of the diketone and alcohol from which they are produced.

*Example 3.—Production of a pyroligneous oil from crude methanol*

In this experiment we used 20,000 parts of crude methanol, as obtained in the Suida process, containing approximately 87 per cent methanol by volume and 2.75 grams per 100 cc. of diacetyl. To this crude methanol we added about 0.5 per cent of concentrated sulfuric acid and permitted the mixture to stand in storage for 24 hours. It was then refluxed, after adding about ½ pound caustic soda per gallon. This caustic soda was sufficient in quantity to make the mixture slightly basic and to reduce the ester content to within marketable limits. The methanol was then fractionated in the usual manner and a water-white distillate was obtained. After all the alcoholic fractions, including the so-called 99 per cent methanol, had been distilled away, the temperature at the head of the column rose rapidly toward 90° C. At 90–93° C. the distillate obtained formed two phases, the supernatant layer being the so-called weak alcohol oil. 536 parts of this oil were collected. This recovery of weak alcohol oil was approximately 5 times that obtained using the same crude methanol and the same storage period but without the addition of the sulfuric acid prior to storage. If this oil is hydrolyzed to recover diacetyl the yield of diacetyl obtained represents about 60 to 65 per cent of that originally present in the crude methanol.

If desired, the weak alcohol oil recovered as described can be refined by steam distillation from an alkaline medium. By fractionation the oil can be separated into a fraction (methanol-diacetyl compound) constituting about 80 per cent by volume, and boiling within the range of about 145–146° C. and another fraction (methanol-acetyl propionyl compound) constituting about 14 per cent, boiling within the range of about 162–163° C., leaving a small higher boiling residue.

The use of a storage period, as in the above example, is important, since it requires a period of 2 to 4 hours in contact with the catalyst in order to ensure a fair yield of pyroligneous oil.

On the other hand a storage period of longer than 24 hours does no harm but increases the yield only slightly. Refluxing of the crude methanol in contact with the sulfuric acid speeds up the reaction considerably but is not necessary and this step is therefore not employed in ordinary plant practice.

The above procedure can be conducted with substantially the same results using any of the catalysts mentioned previously in place of the sulfuric acid.

*Example 4.—Hydrolysis of a pyroligneous oil*

2000 parts of "weak alcohol oil" obtained from the refining of crude wood spirits were placed in a still and rectified through an efficient column. Low-boiling heads were thereby distilled off and discarded until the temperature at the head of the column rose to 100 degrees C. To the still-pot, which was first allowed to cool slightly, was then added a solution of 2 parts of 98 per cent sulfuric acid dissolved in 1000 parts of water. Distillation was continued and 1000 parts of a yellow colored distillate were collected before the temperature rose above 85 degrees C. This yellow colored distillate was found to contain 45 gms. of diacetyl per 100 cc.

The distillates obtained upon distilling pyroligneous oils, such as weak alcohol oil, in the presence of water and a hydrolyzing catalyst are always yellow colored, due to the presence of diacetyl. For convenience in the following description therefore, we shall call these distillates "yellow distillates." Methanol is always present in these distillates and usually water is also present. The separation of the diacetyl from the methanol in these distillates is always difficult, whereas the separation of diacetyl from water presents no particular difficulties. One method of separating the diacetyl is to convert it into an insoluble compound, such as dimethyl glyoxime, as described below.

To the 1000 parts of yellow distillate, obtained as above, there was added with stirring a solution of 860 parts hydroxylamine sulfate dissolved in 2250 parts of water. As soon as the color of the diacetyl was discharged, a solution was added containing 470 parts of sodium carbonate dissolved in 1800 parts of water, stirring being continued.

After warming and subsequently cooling the mixture, 575 parts of crude dimethyl glyoxime separated and were filtered off from the solution. 100 grams of these crystals were dissolved in 2 liters of boiling water, 5 grams of activated carbon were stirred in and, after boiling a few minutes, the carbon was filtered off and the solution cooled. 90 grams of chemically pure dimethyl glyoxime separated and were recovered from this solution.

If it is desired to recover diacetyl rather than dimethyl glyoxime, this can be readily accomplished by hydrolyzing the latter, for example by adding a small amount of a dilute mineral acid, refluxing for a short time to complete the hydrolysis and then distilling off the diacetyl.

*Example 5.—Hydrolysis of a pyroligneous oil*

2000 parts of "weak alcohol oil" obtained from the refining of crude wood spirits, were placed in a flask and rectified to remove the heads up to 100 degrees C., as in Example 4. To the still were then added 50 parts of a saturated aqueous solution of ferric chloride. 1000 parts of yellow distillate were then obtained by continuing the distillation up to a temperature of 85° C. This yellow distillate was found to contain 41.5 gms. of diacetyl per 100 cc.

*Example 6.—Recovery of diketones from yellow distillate by azeotropic distillation*

In this example we used a yellow distillate, containing 33 per cent by volume of diacetyl, as well as water and methanol, obtained by distilling a weak alcohol oil with a small amount of water and 1 per cent of sulfuric acid added to the still. To 12,000 parts of this distillate we added 2,000 parts of water and 2,000 parts of carbon tetrachloride. This mixture was fractionated in a primary still through an efficient column. Carbon tetrachloride forms a low-boiling azeotrope with methanol and this was found to distill first. Portions of this azeotrope distillate were shaken with water in the proportions of 1000 parts azeotrope to 666 parts of water, whereupon the mixture separated into a lower layer, amounting to about 666 parts, of carbon tetrachloride and an upper layer, amounting to about 1000 parts, of aqueous methanol containing a small amount of carbon tetrachloride. The lower layer was returned to the column and this process was continued until 18,500 parts of azeotrope had distilled over and the methanol was exhausted, as indicated by the rising temperature. The temperature was found to break sharply from about 55° to 62° and at this point the distillate was found to break into two phases, indicating that the steam distillation of carbon tetrachloride had commenced. From this point up to 72° the carbon tetrachloride layer was collected for another run, while the water layer was mixed with the aqueous methanol collected previously as the supernatant layer after shaking the azeotrope with water.

When the temperature reached 75° C. the carbon tetrachloride was found to be substantially exhausted and a two-phase distillate of diacetyl and water was then collected up to a temperature of about 80° C. The distillate collected at 78½° contained more than 90 per cent of diacetyl. The lower water layer was returned to the still during this distillation to strip out all of the diacetyl. The upper or diacetyl layer, amounting to 3,700 parts, was collected. This water-saturated diketone layer can be merely dehydrated to give a technical product, by using any of the usual solid dehydrating agents which are inert to diketones, or by the distillation process outline in the following paragraph. In the distillation process homologous ketones, if present, can be separated and recovered.

In the distillation of water-saturated diketones obtained as above a small initial cut is obtained containing residual methanol, solvent and small amounts of diacetyl and water. This cut may be recycled to the primary still for azeotropic separation. At a temperature of about 78½° C. a two phase distillate of water and diacetyl is obtained. The aqueous layer obtained at this point can be united with the initial cut to be returned to the primary still, while the diacetyl layer can be returned to the still until the water is exhausted. Just above the temperature of 78½° C. a small intermediate cut is obtained which can be added to the next charge of wet diacetyl. The temperature curve then rises sharply to a plateau at the boiling point of diacetyl, along which pure diacetyl may be collected, and if acetylpropionyl or homologues are present there will be further plateaus at their boiling points where other high grade fractions may be secured. The sharpness of the separations and the quality of the cuts will, of course, depend on the efficiency of the fractionation operation.

If acetylpropionyl is present a small intermediate cut is obtained between about 90° C. and the boiling point of acetyl propionyl. Between 108° and 110° C. a small amount of pure acetylpropionyl comes over. And it is usually possible to obtain small cuts containing still higher homologues of diacetyl by careful vacuum distillation of the residue.

The carbon tetrachloride layer obtained from the primary still, as described above, amounted to about 2,050 parts and was found to contain about 18 per cent of diacetyl. But this diacetyl content was not lost since the carbon tetrachloride was recycled for use in the next charge. The diacetyl content of the aqueous methanol layer from the carbon tetrachloride cut was found to amount to only 0.2 per cent, which indicates that the separation obtained was excellent. This aqueous methanol layer was fractionated to recover the carbon tetrachloride as azeotrope, this being added to the still in the next following run.

*Example 7.—Recovery of diketones from yellow distillate by azeotropic distillation*

In this example we used a yellow distillate containing 39.2 per cent by volume diacetyl, approximately 5 per cent water and the balance methanol, obtained by distillation of weak alcohol oil with a small amount of water and a trace of sulfuric acid added to the still. To 10,000 parts of this distillate we added 2,000 parts of water and 1,600 parts of benzene contaminated with diacetyl from a previous run. This mixture was distilled. The benzene-methanol azeotrope commenced to come over at 58° C. and portions of this were shaken with half their volume of water, causing separation into two phases, the benzene layer being returned to the still. 1,000 parts of azeotrope mixed with 500 parts water gave 820 parts of an aqueous layer and 680 parts of a benzene layer. A total of 14,000 parts of azeotrope were collected in this manner between 58° and 66° C., all but 350 parts being collected at about 58° C. The aqueous methanol collected in this fashion amounted to 11,400 parts. From 66° to 75° C. the distillate amounted to 1,950 parts. This distillate separated into two layers, a benzene layer containing a few per cent of diacetyl and 450 parts of an aqueous layer which was returned to the column. When the temperature reached 75° C. the distillate consisted essentially of diacetyl and water. Distillation was continued until the temperature reached 85° C. The diacetyl layer amounted to 3,800 parts and the water layer to 1,850 parts, the latter being returned to the still. The wet diacetyl layer thus obtained was further processed as described under Example 6.

*Example 8.—Recovery of diketones from yellow distillate by chemical reaction of methanol*

In this example we employed a yellow distillate containing 35.7 grams per 100 cc. of diketones, calculated as diacetyl. 10,000 parts of this distillate were charged into a still, together with 6,000 parts of 95 per cent acetic acid and 25 parts of sulfuric acid. This charge was refluxed for 20 minutes until the distillate issuing from the condenser had become water-white. The draw was then opened and the distillate drawn off with a fair reflux, the temperature at the head of the still remaining at about 54° C. In this manner 7,000 parts of a diacetyl-free methyl acetate-methanol binary were obtained. Thereafter the temperature rose rapidly to about 78° C. during which interval an intermediate fraction amounting to about 800 parts was collected. This fraction contained a considerable proportion of diacetyl and was therefore set aside to be mixed with the following charge. At 78° C. the distillate broke into two layers, the upper being diacetyl and the lower an aqueous layer. The aqueous layer was separated and returned to the column until all of the diketones had come over. By this time the temperature had passed through the boiling points of the diketone-water binaries (diacetyl-water 78½° C. and acetyl propionyl-water, 86° C.) and had reached about 92° C. A total of 4,000 parts of mixed wet diketones were thus collected. The residue remaining in the still was discarded. These water saturated diketones were dried and separated as described under Example 6.

Formic acid can be substituted for the acetic acid used in this example. The methyl formate produced forms a binary with methanol having a boiling point of 31° C. and it is therefore necessary to employ a refrigerated condenser in order to collect this.

The quantity of acetic acid used in the above example can be varied rather widely. If too little is used, the only result is that the amount of ester-methanol binary is smaller, the intermediate fraction larger and the yield of wet diketones is smaller by a proportionate amount. The optimum quantity of strong acetic acid to be used ranges from about 50 to 60 per cent of the yellow distillate.

It is possible to employ the above described method generally in the recovery of diacetyl from its mixtures with alcohols. Crude methanol containing only from 1 to 4 per cent of diacetyl, for example, can be treated with acetic acid to form methyl acetate with recovery of the diacetyl as described. The sulfuric acid used can be replaced with any other ester-forming catalyst.

Examples 6, 7 and 8 illustrate two general methods of recovering diacetyl from mixtures of diacetyl with an alcohol and water. The first is to add a compound, such as acetic acid, which unites with the alcohol in the mixture to form a decomposable product, such as methyl acetate, having a boiling point above or below the range of 70° to 110° C., followed by distillation to separate the said compound from the remaining components of said mixture. The requirement that the decomposable product formed have a boiling point outside the range stated is necessary in order that this compound may be separated cleanly by fractionation from the diacetyl, which has a boiling point of 87.5–88° C., and from the diacetyl-water binary, boiling at about 78½° C. The second general method involves the addition of an organic compound (methyl acetate, carbon tetrachloride, benzene or the like) which forms an azeotrope with the alcohol having a boiling point outside the range of 70° to 110° C. Azeotropes of this type can be considered as falling within the generic expression "decomposable products" i. e. products which are capable of being separated into their components. A third general method is to add a compound to the mixture which forms a decomposable product with the diacetyl, which product can be separated from the water and alcohol. This third method is illustrated in Example 1 and also in the following example. In Example 1 the decomposable product was dimethyl glyoxime and separation was obtained by precipitation followed by filtration, while in the following example the decomposable compound is a bisulfite complex and this is separated by fractionation.

*Example 9.—Recovery of diketones from yellow distillate by chemical reaction of diketones*

In this example we employed a yellow distillate containing 42 grams diketones, estimated as diacetyl, per 100 cc. We charged 2,000 parts of this distillate into a still together with an aqueous solution containing 2,030 parts (a chemical equivalent) of sodium bisulfite in 5,000 parts of water. The mixture was stirred and was found to become colorless and to heat up due to the reaction of the diketones with the sodium bisulfite. Distillation was then commenced. Methanol came over until the temperature reached 95° C. and the residue in the still was alcohol free. This methanol amounted to 1,120 parts and was found to contain about 3 grams per 100 cc. of diacetyl, due to a slight decomposition of the bisulfite complex which remained in the still.

In order to hydrolyze the bisulfite complex, thereby recovering diacetyl, the still was then heated nearly to the boiling point and vented to air and a dilute sulfuric acid solution was added gradually through a dropping tube. The acid used was formed by mixing 1040 parts concentrated acid with about 1000 parts of water. The acid decomposes the diacetyl-bisulfite complex setting free $SO_2$ and diacetyl. The $SO_2$ was passed out of the still while the diacetyl was returned as reflux. The mixture was refluxed in this manner for 30 minutes to remove the $SO_2$ and finally the residue was distilled. The distillate obtained was the usual diketones-water binary which broke into two layers, the water layer being returned to the still until the still residue was free from diketones. Approximately 1,000 parts of wet diketones were obtained in this fashion. These were placed in a still and refluxed in a gentle current of air to remove the last traces of $SO_2$ and finally dried and separated as described under Example 6.

Owing to the fact that the diketone-bisulfite complex is somewhat soluble in methanol and water, it is not possible to filter off this complex without substantial loss; hence it is advantageous to distill off the methanol as described. The sulfuric acid employed for decomposing the bisulfite complex can be replaced by any other acid or chemical compound which is capable of hydrolyzing this complex, such as phosphoric acid, for example.

The above bisulfite method of separating diketones from alcohols is also of general applicability and can be used to separate the diketones directly from crude methanol, for example, by simply adding the bisulfite to the methanol, followed by distilling off the methanol, leaving the bisulfite complex in the still, this complex being then treated as described.

As mentioned above, this example illustrates a general method which can be used to recover diacetyl from its mixtures with low molecular alcohols such as methanol. The bisulfite used in this example can be replaced by any other bisulfite or other chemical compound, such as a hydroxylamine salt, for example, which is capable of forming a decomposable product with diacetyl which product can be separated and then decomposed to recover the diacetyl.

In addition to the above described methods of recovering diacetyl from diacetyl-water or diacetyl-alcohol-water mixtures, it is possible to accomplish this result by solvent extraction, using a solvent which has a boiling point above or below the range of 60 to 120° C. and which has a preferential solubility for diacetyl. Examples are ethyl and methyl ethers, refined cottonseed oil, etc. After extraction, the diacetyl can be separated from the solvent by fractionation.

It should be mentioned that the method outlined under Example 6 for separating diacetyl from its mixtures with water and carbon tetrachloride is of general applicability for the separation of low-molecular diketones from any of their mixtures with water and lower boiling compounds. This method comprises distilling off the lower boiling compound, continuing the distillation to recover the diketone-water binary, permitting the latter to separate into two phases, while returning the aqueous layer to the still until all of the diketone is removed, then distilling the wet diketone layer, permitting the first runnings to separate into two layers, while returning the diketone layer to the still until all the water is removed, then continuing the distillation to recover the diketones.

While we have described what we consider to be the more advantageous embodiments of our process, it is evident, of course, that various modifications can be made in the specific procedures described without departing from the purview of this invention. It is possible, for example, to employ our processes to recover any of the low-molecular α-diketones, which have adjacent keto groups, from their mixtures with aqueous and/or alcoholic liquors, as well as from mixtures with other organic compounds which do not react with the diketones. In case other organic compounds are present, it is possible to select the alcohol used for the production of a pyroligneous oil compound in such manner that the latter can be separated from the other components by fractionation. The boiling points which have been given for the various compounds of diacetyl and acetyl propionyl with different alcohols can be used in making such a selection. And any of the low-molecular, monohydric primary alcohols can be employed in the reaction with diketones to form the oily products which we have called pyroligneous oils.

While we have mentioned only a few specific compounds, which are capable of reacting to form decomposable products with either the alcohol or the diketone present in diketone-alcohol-water mixtures, whereby the diketones can be separated from the alcohol and water, it is evident that those skilled in the art will be able to select such other compounds as may be applicable to any other specific cases. And, while we have described batch distillation processes, it is evident that the various distillations which have been described can be conducted on the continuous basis. Other modifications of this invention which fall within the scope of the following claims will be immediately evident to those skilled in this art.

What we claim is:

1. In the recovery of diacetyl from pyroligneous oils, the step which comprises treating a pyroligneous oil with a small amount of an acid catalyst and water, and distilling to recover the diacetyl.

2. In the recovery of diacetyl from weak alcohol oil, the steps which comprise treating weak alcohol oil with a small amount of an acid catalyst and water, and distilling to recover the diacetyl.

3. The process of recovering diacetyl from alcoholic technical liquors containing diacetyl in small quantities, which comprises adding to such a liquor a small amount of an acetalizing catalyst, condensing said diacetyl with a low-molecular primary monohydric alcohol, having a concentration in the reaction mixture of at least about 50 per cent by volume, in the presence of said acetylizing catalyst, to form an oily liquid of the nature of an acetal, adding sufficient alkali to make the reaction mixture at least neutral, distilling to recover said oily liquid, hydrolyzing said liquid to produce a mixture of diacetyl and alcohol containing the diacetyl in substantial concentration, adding to said mixture a compound capable of forming with the alcohol a product having a boiling point outside the range of about 70° to 110° C., and distilling to separate said product from the diacetyl.

4. The process of recovering diacetyl from technical alcoholic liquors containing the same in small quantities, which comprises adding to such a liquor a small amount of an acetalizing catalyst, condensing said diacetyl with a low-molecular primary monohydric alcohol, having a concentration in the reaction mixture of at least about 50 per cent by volume, in the presence of said acetalizing catalyst, to form an oily product of the nature of an acetal, adding any alkali necessary to make the solution at least neutral, distilling the reaction mixture to recover said oily product, hydrolyzing said product to produce a mixture of diacetyl and alcohol containing the diacetyl in substantial concentration, adding to said mixture an inert liquid organic compound forming an azeotrope with said alcohol having a boiling point outside the range of about 70° to 110° C., distilling to remove said azeotrope and recovering the diacetyl.

5. The process of claim 4 wherein said added compound is benzene.

6. The process of claim 4 wherein said added compound is carbon tetrachloride.

7. In the recovery of diketones from alcoholic liquors containing small amounts of low molecular weight aliphatic alpha diketones, the process which comprises adding to such a liquor an acetalizing catalyst, condensing said diketone with a low molecular weight primary monohydric alcohol having a concentration amounting to at least about 50 per cent by volume, in the presence of said catalyst, thereby forming an oily product of the nature of an acetal, adding any alkali required to make the reaction products at least neutral, distilling to recover said oily product, hydrolyzing said oily product to produce said diketones in substantial concentration and recovering said diketones from the products of hydrolysis.

8. The process of claim 7 wherein said liquor is the crude alcohol obtained in the destructive distillation of wood.

9. The process of claim 7 wherein said liquor is one obtained from the products obtained by fermenting carbohydrates and cellulosic materials.

10. The process of claim 7 wherein said diketones are recovered from the products of hydrolysis by fractionating in admixture with an inert organic liquid forming an azeotrope with the alcohol present.

11. The process of claim 7 wherein said diketones are recovered by converting the alcohol present in the products of hydrolysis to an ester and fractionating.

12. The process of separating diketones from liquors containing small amounts of at least one low molecular weight aliphatic alpha diketone and at least about 50 per cent by volume of a low molecular weight primary monohydric alcohol, which comprises adding to such a liquor a small amount of an acid catalyst, permitting the mixture to stand until the alcohol and diketones have formed an oily product of the nature of an acetal, adding sufficient alkali to at least neutralize the mixture, distilling to recover said oily product, hydrolyzing said product and recovering the diketone from the products of hydrolysis.

13. The process of separating diacetyl from crude methanol containing at least about 50 per cent by volume of methanol and small amounts of diacetyl, which comprises adding a small amount of a mineral acid to the crude methanol, permitting the mixture to stand until an oily product of the nature of an acetal is formed, making the mixture slightly alkaline, distilling to recover said oily product, hydrolyzing the latter to liberate diacetyl and recovering the latter.

14. The process of separating diketones from liquors containing small amounts of at least one low molecular weight aliphatic alpha diketone and at least about 50 per cent by volume of a low molecular weight primary monohydric alcohol, which comprises adding to such a liquor an acid catalyst, condensing the diketone with said alcohol with the aid of said catalyst to form an oily product of the nature of an acetal, adding sufficient alkali to make the mixture at least neutral, distilling to recover said oily product, hydrolyzing said oily product to produce a mixture of said alcohol and diketone in substantial concentration, converting the alcohol in said mixture to a low molecular weight organic ester having a boiling point outside the range of about 70° to 110° C. and then fractionating to recover said diketone.

15. The process of separating diacetyl from liquors containing small amounts of diacetyl and at least about 50 per cent by volume of methanol, which comprises adding to such a liquor an acid catalyst, condensing the diacetyl with the methanol with the aid of said catalyst to form an oily product of the nature of an acetal, adding sufficient alkali to make the mixture at least neutral, distilling to recover said oily product, hydrolyzing said oily product to form a mixture of methanol and diacetyl in substantial concentration, converting the methanol present into the ester of a low molecular weight aliphatic acid, said ester having a boiling point outside the range of about 70° to 110° C., and then fractionating to recover said diacetyl.

16. The process of separating diacetyl from liquors containing small amounts of diacetyl and at least about 50 per cent by volume of ethyl alcohol, which comprises adding to such a liquor an acid catalyst, condensing the diacetyl with the ethyl alcohol with the aid of said catalyst to form an oily product of the nature of an acetal, adding sufficient alkali to make the mixture at least neutral, distilling to recover said oily product, hydrolyzing said oily product to form a mixture of ethyl alcohol and diacetyl in substantial concentration, converting the alcohol present to ethyl formate and then fractionating to recover the diacetyl.

17. The process of separating diacetyl from liquors containing small amounts of diacetyl and at least about 50 per cent by volume of methanol, which comprises adding to such a liquor an acid catalyst, condensing the diacetyl with the methanol with the aid of said catalyst to form an oily product of the nature of an acetal, adding sufficient alkali to make the mixture at least neutral, distilling to recover said oily product, hydrolyzing said oily product to produce a mixture of methanol and diacetyl in substantial concentration, converting the methanol present into an ester selected from a class consisting of methyl formate and methyl acetate and then fractionating to recover the diacetyl.

DOUGLAS S. CALDER.
KENNETH BRYSON FLEER.